C. E. HANCOCK.
SLEEPING TRAILER.
APPLICATION FILED DEC. 6, 1917.
1,318,994.
Patented Oct. 14, 1919.
4 SHEETS—SHEET 1.
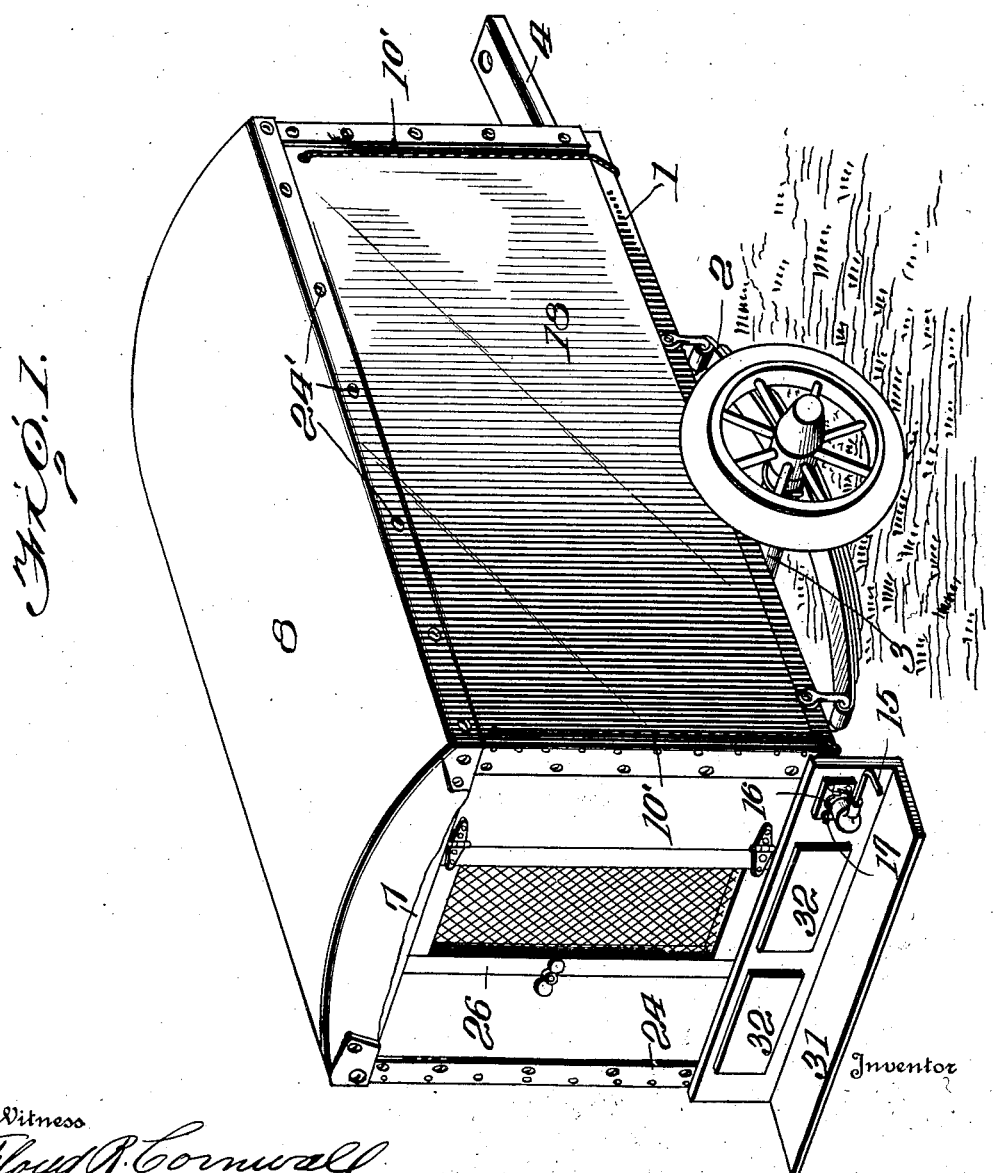

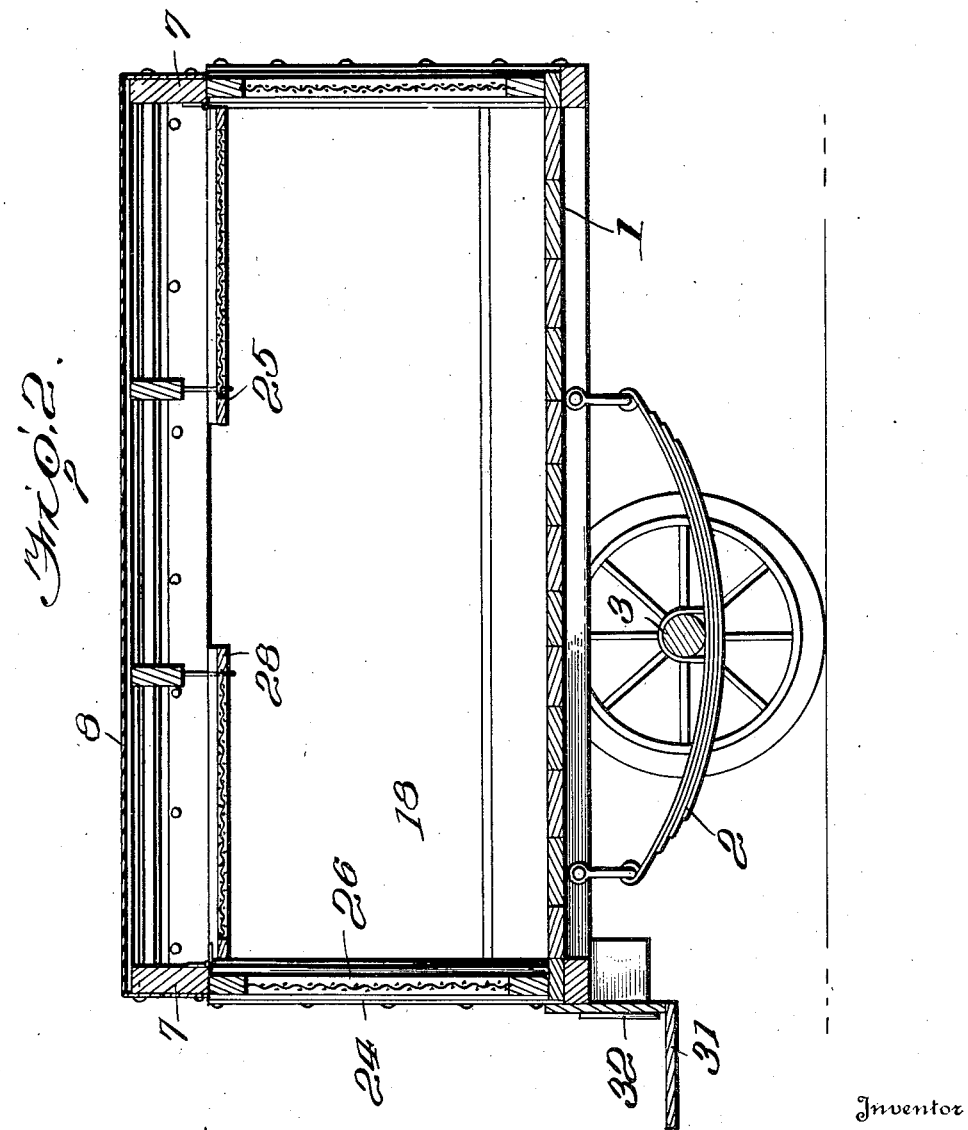

C. E. HANCOCK.
SLEEPING TRAILER.
APPLICATION FILED DEC. 6, 1917.
1,318,994.
Patented Oct. 14, 1919.
4 SHEETS—SHEET 3.
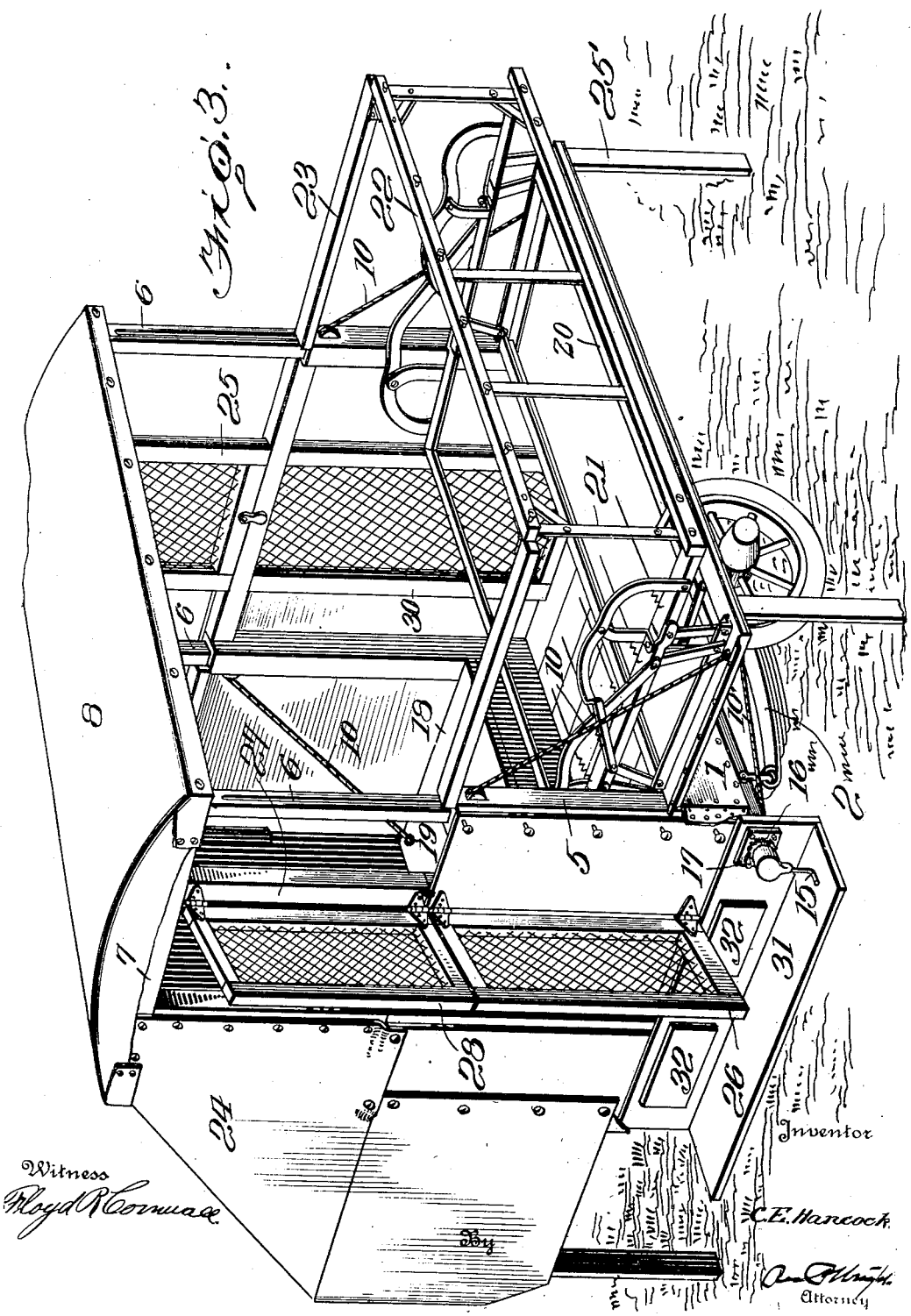

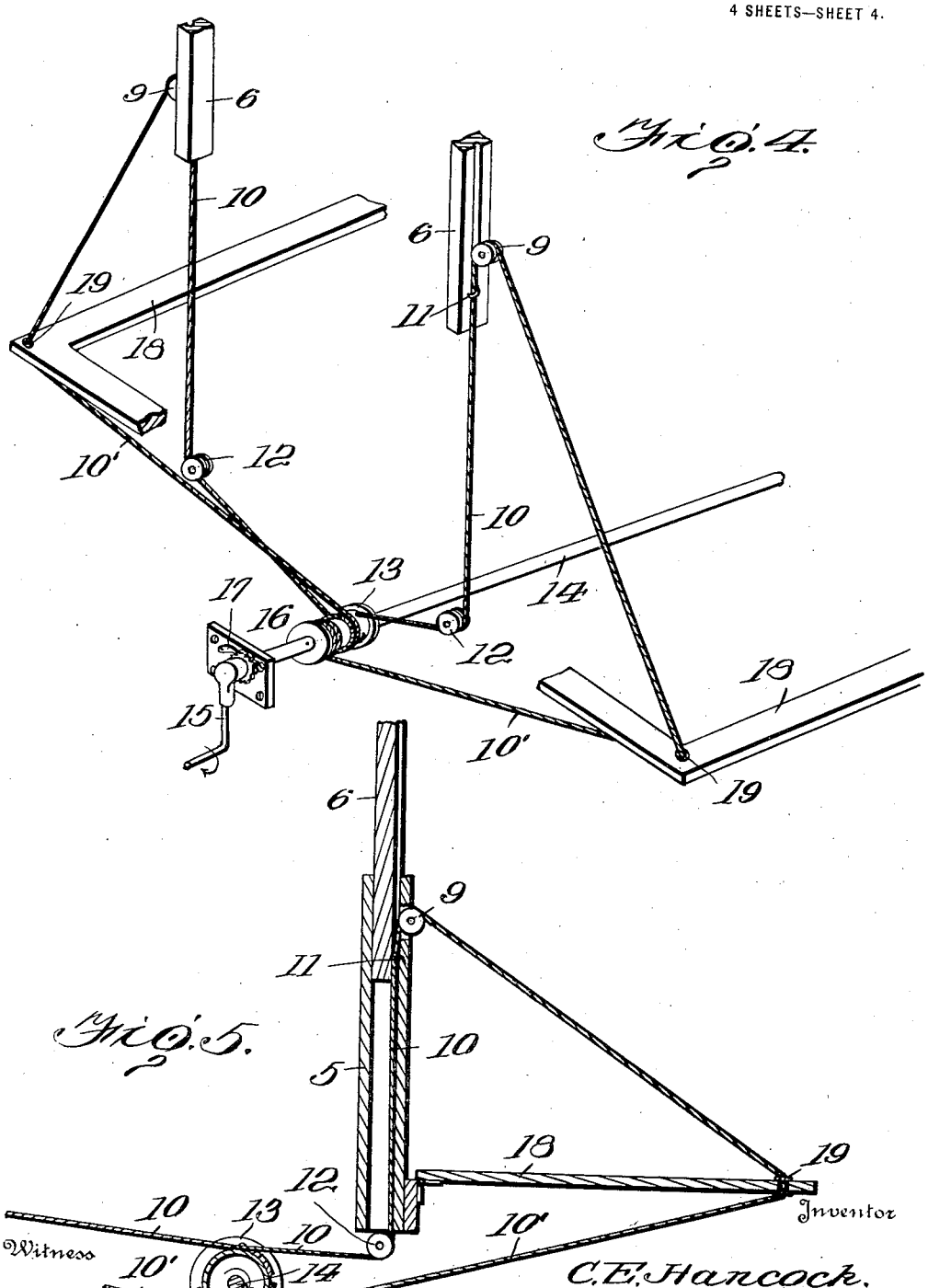

UNITED STATES PATENT OFFICE.

CHARLES E. HANCOCK, OF LIBERAL, KANSAS, ASSIGNOR OF ONE-THIRD TO LEE LARRABEE, OF LIBERAL, KANSAS.

SLEEPING-TRAILER.

1,318,994.      Specification of Letters Patent.      Patented Oct. 14, 1919.

Application filed December 6, 1917. Serial No. 205,754.

*To all whom it may concern:*

Be it known that I, CHARLES E. HANCOCK, a citizen of the United States, residing at Liberal, in the county of Seward and State of Kansas, have invented certain new and useful Improvements in Sleeping-Trailers, of which the following is a specification, reference being had therein to the accompanying drawing.

This invention relates to certain new and useful improvements in trailers for motor vehicles and the like, the object being to provide a trailer having a body provided with a vertically movable top and hinged sides carrying beds, which can be extended to form a sleeping compartment for four persons, the hinged sides and top being so connected that when the sides are lowered the top is raised in order to provide head room within the compartment.

Another object of my invention is to provide a trailer which when in traveling position is very compact, so as to allow the same to be readily attached to a motor vehicle and be drawn over mountain trails without any danger of the same being injured by coming into contact with obstructions such as limbs of trees and the like.

Another and further object of the invention is to provide a trailer which is provided with a body having a door at the rear formed of sections, the upper section of the door being mounted within the frame hinged to the top so as to allow the frame to be swung into horizontal position under the top when the top is in lowered position, and into vertical position when the top is raised so as to aid in supporting the top.

Another and further object of the invention is to provide a trailer which can be completely inclosed by a canopy so as to protect the occupants from the weather when being used as a sleeping compartment, and to protect the contents of the trailer when being used for carrying a camping outfit.

Another and still further object of the invention is to construct a trailer in such a manner that the same can be readily converted from the traveling position into position to form a tent or sleeping compartment.

Other and further objects and advantages of the invention will be hereinafter set forth and the novel features thereof defined by the appended claims.

In the drawings—

Figure 1 is a perspective view of my improved construction of sleeping trailer in traveling position.

Fig. 2 is a longitudinally vertical section through the same.

Fig. 3 is a perspective view of a trailer adjusted in position to be used for sleeping purposes, one of the canopies being removed.

Fig. 4 is a perspective view of the cables and drum for raising the top and lowering the sides; and Fig. 5 is a vertical section through one of the corner posts of the body showing the manner of mounting the corner posts of the top, and connecting the same to the sides of the cables so that the top will be raised as the side frame is lowered by the winding of the cable on the drum.

Like numerals of reference refer to like parts in the several figures of the drawings, In the drawing 1 indicates the body of my improved construction of trailer, which is supported on springs 2 carried by a wheeled axle 3 which may be of any well known construction now in use, said body having a tongue 4 adapted to be connected by a suitable draft connection to a motor vehicle so that the trailer will be drawn in the rear of the vehicle to which it is attached.

The body 1 is provided with hollow corner posts 5 in which are slidably mounted the grooved posts 6 of a top frame 7 which is provided with the ordinary canvas covering 8. The construction of each of the corner posts of the body and each of the posts of the top are identical, and a detailed description of one will be sufficient for all. Each hollow post 5 is provided with a pulley 9 in its outer wall over which passes a cable 10 arranged within a groove of the post 6 and connected thereto as shown at 11; one end of the cable below the post 5 passes over a guide pulley 12 and is connected to a winding drum 13 carried by a shaft 14 which is provided with a crank 15 extending out to the rear of the body so that the same can be readily operated, said shaft carrying a ratchet wheel 16 adapted to be engaged by a pawl 17 so as to lock the shaft 14 in its adjusted position. The shaft 14 is provided with a drum 13 at each end, and in Fig. 4 I have shown the drum at the end adjacent the crank, and in Fig. 5 I have shown the drum arranged adjacent the opposite end of the shaft for operating the cable arranged at the front corner posts, but as the operation of the cables at each end of the shaft and drum are identical, the description of one will be sufficient for both.

The body is provided with hinged canvas covered side frames 18 through which the cable 10 passes and is connected as shown at 19, the opposite end of the cable being secured to the drum 13 in such a manner that when the drum is rotated so as to wind the portion 10' of the cable thereon, the other end of the cable will be unwound therefrom.

Assuming that the trailer is in the position shown in Fig. 1, and it is desired to convert the same into a sleeping compartment, by operating the crank 15 the portion 10' of the cable 10 will be wound on the drum 13 so as to draw downwardly on the side frames 18, and as the side frames 18 move into horizontal position the posts 6 are moved vertically within the hollow corner post 5 of the body so as to raise the top as shown in Fig. 3.

Each of the side frames of the body carries a sectional bed frame 20 provided with the usual fabric bottom, said bed frame being preferably formed of a central section having end sections hinged thereto, so that said sections can be folded in vertical position parallel with one another in order to allow the sides of the body to be raised into vertical position, and when the sides of the body are in horizontal position the sections of the bed frame are lowered the outer sections extending slightly beyond the side of the body. The outer section of each bed frame carries pivoted standards 21 which are adapted to be raised into vertical position as shown in Fig. 3, forming a support for a frame composed of a bar 22 having end pieces 23 hinged thereto which are supported at their free ends by a corner post 5 of the body, said frame being provided with buttons so as to allow a canopy 24 to be placed over the same to form a tent or covering for the bed. The edges of the side frames are provided with buttons 24' adapted to pass through the eyes of the side flaps of the covering 8 or top, when the trailer is in position as shown in Fig. 1. The canopy is adapted to be formed tent shape so that the sides and ends which are provided with eyes can be readily fastened by the buttons carried by the body and the hinged side frames, whereby the beds will be entirely inclosed. The hinged side frames when in lowered position can be supported by legs 25' as shown in Fig. 3.

In order to provide means for holding the top in raised position, I provide the forward end of the top with a pivoted frame 25 which can be moved into horizontal position as shown in Fig. 2, when the top is in lowered position and into vertical position as shown in Fig. 3, so as to rest on the forward upper edge of the frame of the body as clearly shown. The body is provided with a hinged door 26 at the rear and the top at the rear is provided with a hinged door frame 27 carrying a door 28, said frame being capable of being swung into the position shown in Fig. 2, when the top is lowered, and into position shown in Fig. 3, when the top is raised. By this construction the doors 26 and 28 are in vertical alinement with one another in order to provide a door opening of sufficient height to allow a person to enter the trailer between the bed frames. The forward end of the trailer is provided with a frame 30, said frame together with the frame 25 and doors 26 and 28 being covered with screening so as to allow air to pass through the trailer in order to provide ventilation. Suitable curtains are provided for closing these frames so as to protect the inside of the trailer from rain or snow, and by this construction the trailer can be entirely inclosed when either in traveling position or in camping position. The rear of the trailer is provided with a foot board 31 forming a step and with a pair of cabinet draws 32 for holding camping equipment.

From the foregoing description it will be seen that I have provided a sleeping trailer which can be readily attached to a motor vehicle so that the same can be drawn to the rear of the vehicle, the same being so constructed that a camping equipment can be carried therein, and when desired the same can be converted from a trailer to a tent or sleeping compartment in which beds are provided for accommodating four persons, ample head room being provided to allow occupants to enter the sleeping compartment.

I claim:

1. An automobile trailer comprising a body having hinged sides and a vertically movable top, said sides forming a closure for said body when said top is in lowered position, sectional bed frames carried by the sides of said body, a connection between said sides and top, for causing said top to be raised vertically when said sides are lowered, a canopy supporting frame carried by said sides, and a canopy arranged over said frame for inclosing said bed.

2. A sleeping trailer having a body mounted on wheels, said body having a top mounted to move vertically, sides hinged to said body carrying bed frames, means for raising said top by the lowering of said sides, and frames carried by said top engaging said body for holding said top in raised position.

3. An automobile trailer comprising a body having hollow corner posts provided with pulleys, a top having posts slidably mounted in said hollow posts, a revoluble shaft arranged under said body, drums carried by said shaft, sides hinged to said body, and cables carried by said drums passing over said pulleys having a connection with the posts of said top and with said sides for raising said top as said sides are drawn into lowered position.

4. An automobile sleeping trailer comprising a body mounted on wheels having hinged sides and a vertical movable top, sectional bed frames carried by said sides, a movable frame supported by said bed frame, means for raising said top and lowering said sides, and a canopy for inclosing said bed frame having a connection with said supported frame.

5. A sleeping trailer having a movable mounted top and pivoted sides, a connection between said sides and top for causing said top to be raised vertically as said sides are lowered, bed frames carried by said sides, frames carried by said top engaging said body for holding said top in raised position, and canopies for inclosing the sides of said top when said bed frames are in extended position.

6. An automobile trailer comprising a body mounted on wheels having hinged sides provided with hollow corner posts, a top provided with posts slidably mounted in said corner posts, pulleys carried by said corner posts, cables passing over said pulleys connected to the posts of the top and to the free ends of said sides, hinged frames carried by said top adapted to be lowered into vertical position for supporting said top when in raised position, said body being provided with a rear door, bed frames carried by the sides, and canopies adapted to be connected to said top, body and sides for inclosing said bed frames.

7. A sleeping trailer comprising a wheel supported body having hinged sides provided with bed frames, a top mounted to move vertically on said body, cables connecting said sides to said top, drums connected to said cables for swinging said sides into horizontal position, for causing said top to be moved vertically and pivoted frames carried by the top engaging said body when said top is in raised position.

In testimony whereof I hereunto affix my signature in the presence of two witnesses.

CHARLES E. HANCOCK.

Witnesses:
   CHAS. SUMMERS,
   SUSIE APPULIN.